May 30, 1944.    J. M. TYRNER    2,349,891
HEAT CONTROL FOR ARC WELDING
Filed Sept. 24, 1941
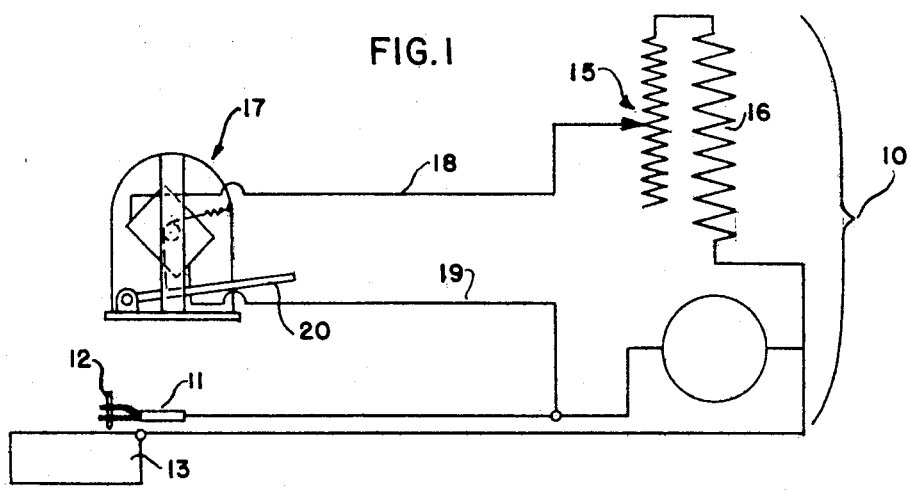
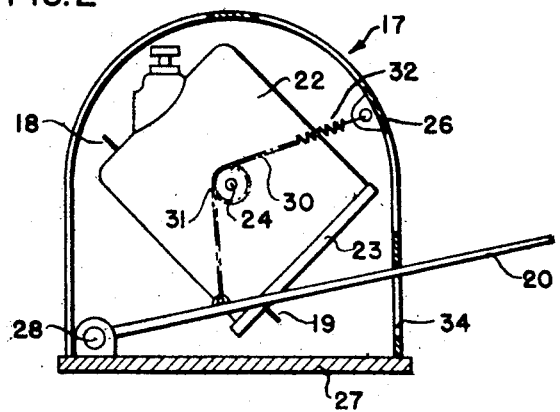
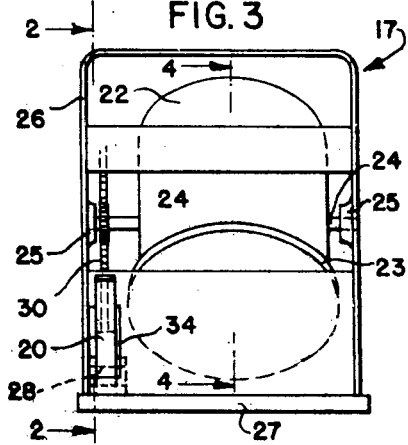
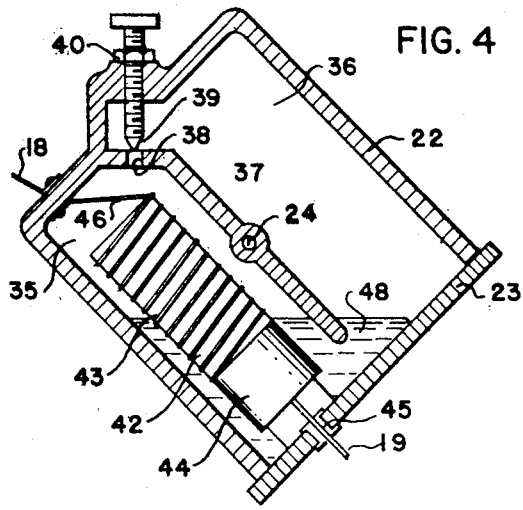
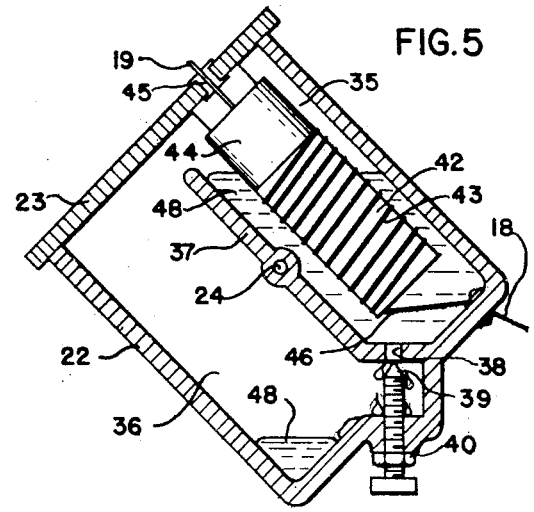
INVENTOR
JOSEPH M. TYRNER
BY
ATTORNEY Patented May 30, 1944

2,349,891

UNITED STATES PATENT OFFICE 2,349,891

HEAT CONTROL FOR ARC WELDING

Joseph M. Tyrner, Englewood, N. J., assignor to Air Reduction Company, Incorporated, New York, N. Y., a corporation of New York Application September 24, 1941, Serial No. 412,061

5 Claims. (Cl. 201—55)

This invention relates to arc welding, and it is an object of the invention to provide improved apparatus for controlling the heat at the end of a weld or bead.

The end of a bead, where the welding is stopped, may well be compared with the riser of a casting. The outside cools and solidifies first forming a crust over the still liquid core. When the core solidifies later, it contracts and therefore will not fill out its former volume inside of the crust. For this reason the core of the riser, or bead, becomes porous, and impurities accumulate there, because the impure metal has a lower melting point and solidifies last. The risers of castings are removed and only the sound part is left, but no part of a bead may be removed readily. It is not possible to have a counterpart of a riser. The procedure followed in welding is to taper the heat gradually off. Then the end of the bead solidifies from the bottom up and no crust enclosing a liquid core is formed. Many suggestions are known in the art because there are many possibilities to reduce the output of a generator, thus reducing the heat. The success of these suggestions depends mainly on their ability to reduce the heat in such a way as to make the formation of a crust over a liquid core impossible.

This invention provides simplified and reliable apparatus for reducing the arc. The invention comprises a variable resistor that is placed in series with the field circuit of a welding generator, or in the primary circuit of a welding transformer.

Another object of the invention is to provide an improved semi-automatic heat control. The time when the control is operated is determined by the welder, but the rate at which the heat of the arc is reduced is controlled automatically in accordance with the setting of a variable adjustment. This automatic control is particularly advantageous because the elimination of imperfections at the end of the weld bead depends not only on a reduction of the arc heat but upon a reduction at the correct rate. This invention provides a simplified apparatus for varying the heat without the exercise of any judgment on the part of the welder or operator.

Other objects, features and advantages of the invention will appear or be pointed out as the specification proceeds.

In the accompanying drawing, forming a part hereof:

Fig. 1 is a diagrammatic view of arc welding apparatus equipped with the semi-automatic heat controller of this invention.

Fig. 2 is an enlarged side view of the heat controller shown in Fig. 1, with part of the frame broken away along the line 2—2 of Fig. 3.

Fig. 3 is a front view of the apparatus illustrated in Fig. 2.

Fig. 4 is an enlarged vertical sectional view taken on the line 4—4 of Fig. 3.

Fig. 5 is a view similar to Fig. 4, but showing the housing rotated into position to reduce the field current.

Current for arc welding is supplied by a generator 10 to an electrode holder 11. The arc is struck between an electrode 12 in the holder 11 and a work piece 13 in a manner well understood in the art.

A variable-resistance rheostat 15 is connected in series with field winding 16 of the welding generator for regulating the open circuit voltage of the generator. A controller 17 is connected in series with the rheostat 15 and the field winding 16 of the generator. The controller 17 is portable, being connected with the generator 10 by flexible conductors comprising long wires 18, 19, and is located within convenient reach of the welder so that he can set it in operation by moving a lever 20 that can be operated as a foot pedal.

The controller 17 includes a housing 22, which may be made of iron. The housing 22 is closed by a cover 23 permanently secured in place. A shaft 24 extends through the housing 22 and projects at both ends beyond the housing to provide trunnions on which the housing is rotatably supported in bearings 25 of a frame 26 secured to a base 27. The lever 20 is connected to the base 27 by a pivot connection 28.

The shaft 24 is an integral part of the housing 22 and turns as a unit with the housing. A chain 30, connected at one end with the lever 20, passes over a sprocket 31 that is secured to the shaft 24. The other end of the chain 30 is fastened to a spring 32 which is anchored to the frame 26. The spring 32 holds the housing 22 in the position shown in Fig. 2 and may be said to bias the housing toward this position. The lever 20 extends through a slot 34 in the front of the frame 26. The limiting position to which the spring 32 turns the housing 22 is determined by the upper end of the slot 34 in the frame 26. The lever 20 strikes against the end of this slot when the housing is in the position shown in Fig. 2. Likewise the limiting position to which the operator can rotate the housing 22 by actuating the lever 20 downward, is determined by the lower end of the slot 34.

The inside of the housing 22 is divided into two chambers 35 and 36 by a partition wall 37 (Fig. 4) which does not extend the full distance to the cover 23 and thus leaves the chambers 35, 36 open to one another at one end. There is a restricted passage 38 between the chambers 35 and 36 at the other end of the housing.

The passage 38 is commanded by a needle valve 39 that threads through an end wall of the housing 22 so that the extent of opening of the valve can be adjusted from outside of the housing. A jam-nut 40 on the threaded portion of the needle valve outside of the housing 22 locks the needle valve in any adjusted position.

A core comprising a porcelain insulator 42 is attached to the cover 23 and extends throughout most of the length of the chamber 35. A resistance element is made by wrapping a coil of suitable iron alloy wire 43 around the insulator 42. An electrically-conductive covering 44 surrounds one portion of the insulator 42. The coil of wire 43 is connected at one end to the covering 44, and the covering 44 is connected with the flexible conductor 19 that connects the resistance element in the circuit of the arc-welding apparatus. The conductor 19 enters the housing 22 through insulation 45.

The other end of the resistance wire 43 has a terminal portion 46 connected to the housing 22, and the housing 22 is connected with the flexible conductor 18 that joins the resistance unit with the circuit of the arc-welding apparatus. The housing 22 contains a body of electrically-conductive liquid, preferably mercury 48. The housing 22 and its contents comprise a "resistance device" or "resistance unit" in the circuit of the welding apparatus.

With the housing 22 in the position shown in Fig. 4 the mercury 48 short circuits the resistance element by connecting it near the covering 44 to the housing 22. This is the position used for welding. When the operator intends to stop welding, he depresses the lever 20 (Fig. 1) and turns the housing 22 into the position shown in Fig. 5, the rotation being in a counter-clockwise direction so that all of the mercury enters the chamber 35. The resistance element is still short circuited by the mercury, but the liquid flows through the passage 38 into the chamber 36 and gradually cuts in more and more of the resistance. When the level of the mercury drops below the end of the wire coil 43, the full resistance of that coil is in series with the field 16 (Fig. 1) of the welding generator. The value of the resistance of the coil 43 is so chosen that the arc from the electrode 12 fades before all of the resistance of the coil 43 has been cut into the generator field circuit.

The rate at which the heat of the arc is reduced can be controlled by changing the position of the needle valve 39 so that the mercury flows through the passage 38 faster or slower.

Before the arc is started anew for further welding, the lever 20 is released by the operator and the spring 32 turns the housing 22 back to the position shown in Fig. 4.

Changes and modifications can be made in the illustrated embodiment of the invention and some features of the invention can be used without others without departing from the invention as defined in the claims.

I claim:

1. Means for controlling the heat of electric arc-welding apparatus including a generally cylindrical housing containing a partition extending in the direction of the cylindrical axis of the housing and dividing the housing into two chambers communicating with each other at one end of the housing by a passage through the partition, a valve for controlling the extent of opening of said passage, said partition terminating at a location short of the other end of the housing so as to leave the chambers in communication at one end independently of said valve, a resistance element in one of the chambers, and a conducting liquid that short circuits at least a portion of the resistance element when the housing is in one position, the chambers being so related that the liquid drains from the chamber containing the resistance element and through said passage to the other chamber when the housing is in another position.

2. A heat controller for arc welding including a housing in which are two chambers for a conducting liquid, electric resistance means in one chamber and connected in a circuit in such a way that the amount of the resistance depends upon the amount of conducting liquid in the chamber, a restricted passage through which liquid from the chamber containing the resistance means drains into the other chamber when the housing is in one position, said chambers being in unrestricted communication with one another through an opening so located that the conducting liquid flows freely from said other chamber into the chamber containing the resistance means when the housing is in another position, and means urging the housing into the position that causes liquid to flow into the chamber containing the resistance means.

3. A heat controller for arc-welding apparatus including a portable frame, a closed housing, horizontal trunnions extending from opposite sides of the housing intermediate the ends of the housing, bearings in the frame in which the trunnions are rotatably supported, a partition wall dividing the interior of the housing into two chambers that are open to one another at one end of the housing and that communicate with one another at the other end of the housing through a restricted passage, a needle valve commanding the passage, and threading through a wall of the housing for adjustment from outside of the housing, flexible conductors leading from opposite ends of the housing to a circuit to be controlled, an insulating core within one of the chambers, a coil of resistance wire wrapped around the core and connected at opposite ends with said conductors, a body of mercury within the housing for short circuiting the resistance coil when the housing is turned with the coil-containing chamber lowermost, a spring urging the housing into such a position, and an operator-actuated lever for overturning the housing against the tension of the spring.

4. A heat controller for arc welding including a housing in which are two chambers for a conducting liquid, electric resistance means in one chamber and connected in a circuit in such a way that the amount of the resistance depends upon the amount of conducting liquid in the chamber, and a restricted passage through which liquid from the chamber containing the resistance means drains into the other chamber when the housing is in one position, said chambers being in unrestricted communication with one another through an opening so located that the conducting liquid flows freely from said other chamber into the chamber containing the resistance means when the housing is in another position.

5. A heat controller for arc-welding apparatus including a portable frame, a closed housing, horizontal trunnions extending from opposite sides of the housing intermediate the ends of the housing, bearings in the frame in which the trunnions are rotatably supported, a partition wall dividing the interior of the housing into two chambers that are open to one another at one end of the housing and that communicate with one another at the other end of the housing through a restricted passage, flexible conductors leading from opposite ends of the housing to a circuit to be controlled, a coil of resistance wire within one of the chambers, a body of mercury within the housing for short circuiting the resistance coil when the housing is turned with the coil-containing chamber lowermost, a spring urging the housing into such a position, and an operator-actuated lever for overturning the housing against the tension of the spring.

JOSEPH M. TYRNER.